C. DIERKE.
DENTAL FLOSS HOLDER.
APPLICATION FILED AUG. 18, 1915.

1,262,464.

Patented Apr. 9, 1918.

Witnesses:

Charles Dierke
Inventor,
By
Atty.

UNITED STATES PATENT OFFICE.

CHARLES DIERKE, OF PORTLAND, OREGON, ASSIGNOR OF ONE-HALF TO GUSTAV FREIWALD, OF PORTLAND, OREGON.

DENTAL-FLOSS HOLDER.

1,262,464.     Specification of Letters Patent.     Patented Apr. 9, 1918.

Application filed August 18, 1915. Serial No. 46,055.

*To all whom it may concern:*

Be it known that I, CHARLES DIERKE, a citizen of the United States, residing in the city of Portland, county of Multnomah, and State of Oregon, have invented a certain new and useful Improvement in Dental-Floss Holders, of which the following is a specification.

My invention relates to dental floss holders, and has among its salient objects, to provide a simple and inexpensive, yet practical little instrument adapted to receive the spool or bobbin upon which dental floss is wound for sale in the open market, whereby said spool, or bobbin, of floss as purchased, can be quickly attached to my holder, and the floss used therefrom, after which it can be removed and another spool, or bobbin, of floss be put in its place; and, to provide a dental floss holder of the character referred to in which the spool or bobbin of dental floss, when attached thereto, forms a gripping portion of the instrument.

In order that others may understand my invention, I have shown a practical and simple form thereof in the accompanying sheet of drawing, which I will now describe.

Figure 1:
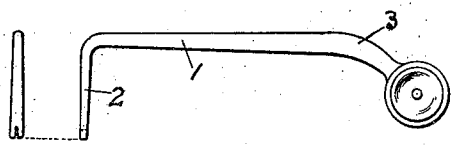
Figure 1 is a side elevation of my device without the spool, or bobbin, of floss.
Figure 2:
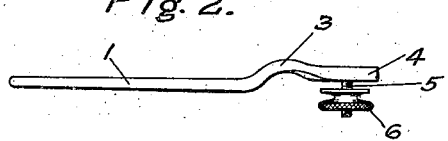
Fig. 2 is an edge view thereof.

Referring now more in detail to the drawings, my invention comprises an arm 1, with a finger 2 at one end, and at its other end provided with a kink or off-set portion 3, and terminating in a disk-like portion 4, provided with a screw 5, adapted to receive a thumb nut 6. The finger 2 is provided with a slit adapted to receive the end of the dental floss, as indicated at 7, Fig. 3. 8 designates a spool, or bobbin, on which dental floss is wound for sale and this has a central opening adapted to fit over the screw 5, when the thumb nut 6 is removed, and is rigidly held in place by means of said thumb nut 6, when the latter is made tight.

Figure 3:
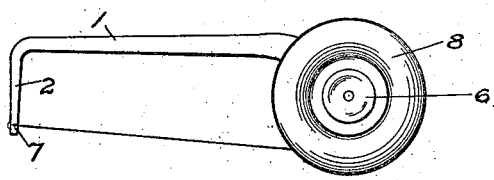
Fig. 3 is a side elevation of the device with a spool of floss attached thereto ready for use.
Figure 4:
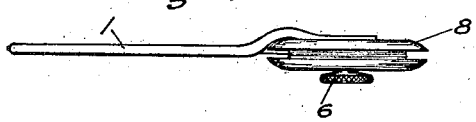
Fig. 4 is an edge view thereof.

Thus it will be seen that it is only necessary to purchase the spool, or bobbin, of floss, remove the thumb nut 6, place the spool, or bobbin, upon the screw 5, and then replace the thumb nut 6, the end of the floss being drawn from the spool, or bobbin, and provided with a little knot and inserted in the slit in the end of the finger 2, as indicated at 7, Fig. 3. The spool, or bobbin, can be made tight by means of the thumb nut 6, and the floss is thus stretched from the finger 2, to the spool or bobbin 8. The spool, or bobbin, also serves to give an increased gripping area to the little instrument during its use.

I am aware that slight changes can be made in my invention as here shown and described, without departing from the spirit thereof, and I do not, therefore, limit the invention to the particular form here shown for illustrative purposes, except as I may be limited by the hereto appended claims.

I claim:

A dental floss holder adapted to have attached thereto a bobbin of floss as sold in the market, said bobbin having a central opening therethrough, said holder comprising an arm provided at one end with an angular finger the end of which is adapted to have attached thereto the end of said floss extending directly thereto from said bobbin at a space from said arm and the other end of said arm being off-set laterally from the plane of the arm and the angle finger thereon, and means for attaching the end of said arm to the side of said bobbin through the center thereof, whereby said bobbin can be turned thereon, said bobbin and the arm of said holder lying in substantially the same plane, whereby the floss extending from said bobbin to said finger lies wholly within the plane of said arm and its finger.

Signed at Portland, Multnomah county, Oregon, this 12th day of August, 1915.

CHARLES DIERKE.

In presence of—
I. M. GRIFFIN,
R. B. FRENCH.

Copies of this patent may be obtained for five cents each, by addressing the "Commissioner of Patents, Washington, D. C."